US010448335B2

(12) United States Patent
Jain et al.

(10) Patent No.: US 10,448,335 B2
(45) Date of Patent: Oct. 15, 2019

(54) COMMUNICATING TIMING INFORMATION FOR A NEXT DIO TRANSMISSION

(71) Applicant: LANDIS+GYR INNOVATIONS, INC., Alpharetta, GA (US)

(72) Inventors: Saurabh Jain, Ghaziabad (IN); Shobhit Kumar Singh, Ghaziabad (IN)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 41 days.

(21) Appl. No.: 15/834,742

(22) Filed: Dec. 7, 2017

(65) Prior Publication Data
US 2019/0182774 A1 Jun. 13, 2019

(51) Int. Cl.
*H04W 52/02* (2009.01)
*H04L 29/06* (2006.01)
*H04W 84/18* (2009.01)

(52) U.S. Cl.
CPC ......... *H04W 52/0235* (2013.01); *H04L 69/28* (2013.01); *H04W 84/18* (2013.01)

(58) Field of Classification Search
CPC .... H04L 69/28; H04W 52/0235; H04W 84/18
See application file for complete search history.

(56) References Cited

U.S. PATENT DOCUMENTS

| 9,736,771 B2* | 8/2017 | Guo | H04W 52/0203 |
| 2005/0102443 A1* | 5/2005 | Mahany | G06F 15/0225 |
| | | | 710/18 |
| 2012/0314739 A1* | 12/2012 | Bhadra | H04W 40/246 |
| | | | 375/219 |
| 2014/0204759 A1* | 7/2014 | Guo | H04W 28/08 |
| | | | 370/236 |
| 2016/0165567 A1* | 6/2016 | Liu | H04B 17/318 |
| | | | 455/456.2 |
| 2016/0182306 A1* | 6/2016 | Liu | H04W 84/18 |
| | | | 370/255 |
| 2016/0212698 A1* | 7/2016 | Guo | H04W 52/0203 |
| 2016/0219414 A1* | 7/2016 | Purohit | H04W 4/06 |
| 2017/0034772 A1* | 2/2017 | Purohit | H04W 48/16 |
| 2017/0223700 A1* | 8/2017 | Thubert | H04L 45/22 |

(Continued)

OTHER PUBLICATIONS

Liu et al., "Battery Energy Management in Heterogeneous Wireless Machine-to-Machine Networks", Sep. 2015, 7 pages.

(Continued)

*Primary Examiner* — Khaled M Kassim
(74) *Attorney, Agent, or Firm* — Kilpatrick Townsend & Stockton LLP

(57) ABSTRACT

A network using a routing protocol for low-power and lossy networks ("RPL") can provide timing information for a next destination oriented directed acyclic graph ("DODAG") information object ("DIO") packet by including DIO timing information in an RPL packet or a beacon. When a low energy node receives the RPL packet, it may use the DIO timing information to determine a wake time which corresponds to the timing of the next DIO packet. The low energy node may enter a sleep state after determining the wake time and remain in the sleep state until the wake time when it enters an active state and listens for the next DIO packet. Alternatively, DIO slots in a DIO slot frame may be allocated for communicating DIO packets.

5 Claims, 8 Drawing Sheets

(56) References Cited

U.S. PATENT DOCUMENTS

| | | | |
|---|---|---|---|
| 2017/0353292 A1* | 12/2017 | Thubert | H04J 3/0679 |
| 2018/0183701 A1* | 6/2018 | Qi | H04L 45/02 |
| 2018/0331940 A1* | 11/2018 | Jadhav | H04L 45/121 |
| 2019/0081892 A1* | 3/2019 | Thubert | H04L 45/48 |
| 2019/0104519 A1* | 4/2019 | Sydir | H04L 41/12 |

OTHER PUBLICATIONS

Vucinic et al., "Topology Construction in RPL Networks over Beacon-Enabled 802.15.4", Grenoble Alps University, CNRS Grenoble Informatics Laboratory UMR 5217, Apr. 30, 2014, 7 pages.

* cited by examiner

| ASN=0 | ASN=1 | ASN=2 | ASN=3 | ASN=4 | ASN=5 | ASN=6 | ASN=7 | ...... |
|---|---|---|---|---|---|---|---|---|
| PC→A | PC$_{adv}$ | | A$_{adv}$ | | B$_{adv}$ | | | |
| | | | | B→C | | | PC→A | |
| B→C | A(Rx) B(Rx) | | | | C(Rx) | B→C | | |

| ASN=0 | ASN=1 | ASN=2 | ASN=3 | ASN=4 | ASN=5 | ASN=6 | ASN=7 | ... | ASN=n | ... |
|---|---|---|---|---|---|---|---|---|---|---|
| PC→A | PC$_{adv}$ | PC$_{dio}$ | A$_{adv}$ | B$_{dio}$ | B$_{adv}$ | A$_{dio}$ | | | B$_{dio}$ | |
| | | | | B→C | | | PC→A | | | |
| B→C | A(Rx) B(Rx) | A(Rx) B(Rx) | | C(Rx) | C(Rx) | B→C | | | | |

COMMUNICATING TIMING INFORMATION FOR A NEXT DIO TRANSMISSION

TECHNICAL FIELD

The present disclosure relates generally to computer network communication and more specifically, but not by way of limitation, this disclosure relates to communicating timing information for a next DIO transmission.

BACKGROUND

A routing protocol for low-power and lossy networks ("RPL") describes a trickle mechanism for determining when to transmit destination oriented directed acyclic graph ("DODAG") information object ("DIO") packets in a network. A node that receives a DIO packet may use it for network discovery and maintenance. DIO packets may be transmitted at irregular times since the transmission interval between DIO packets is based on the current state of the network. Generally, DIO packets are transmitted more frequently during network formation and periods of network instability and then less frequently once the network stabilizes. A transmitting node may use a trickle timer to determine when to transmit a DIO packet. When the trickle timer expires, the transmitting node transmits a DIO packet. Since the timing of the DIO packet transmissions may be irregular and the transmission time for the next DIO packet may be unknown, a node generally remains in a listen mode to avoid missing a DIO packet. This may prevent a low energy ("LE") node, such as a battery powered node, from entering a low power mode or sleep state. It would be helpful if a node could determine when the next DIO packet will be transmitted so that it could enter a low power mode and then wake in time to receive the next DIO packet. Even if the node is a fully functioning device ("FFD"), knowing when to expect the next DIO packet may allow the node to more effectively manage its own operations.

SUMMARY

The present disclosure describes systems and methods for communicating timing information for a next DIO transmission. In some aspects, a node includes a trickle timer for determining transmission intervals for its DIO transmissions. The node may determine a time for a next DIO transmission and include timing information for the next DIO transmission in a current DIO transmission. The timing information may be included in a DIO timing option in an RPL packet or in a new IE format, which is referred to herein as a DIO timing IE, in a beacon and may indicate a time value or an ASN value for the next DIO transmission. When a receiving node receives the DIO transmission with the timing information for the next DIO transmission, the receiving node may use the timing information to determine when to listen for the next DIO transmission. The receiving node may enter a sleep state or perform other functions until the time for listening for the next DIO transmission.

In other examples, a node is allocated a main DIO slot and at least one additional DIO slot in each DIO slot frame. When the trickle timer expires, the node may send its DIO transmission during the next DIO slot or the next main DIO slot based on the amount of time until the next DIO transmission.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Systems and methods are provided for communicating timing information for a next destination oriented directed acyclic graph ("DODAG") information object ("DIO") transmission or DIO packet. In one example, timing information for the next DIO packet is provided in an RPL packet including, but not limited to, a DIO packet, a destination advertisement object ("DAO") packet, or a destination advertisement acknowledgement ("DAO-ACK") packet. In another example, the timing for the next DIO packet is provided in a beacon. In yet another example, one or more time slots are allocated as DIO time slots and a DIO packet is transmitted during the allocated time slot. Providing information about the timing of the transmission of the next DIO packet, may allow a low energy ("LE") node to enter a sleep state and then wake prior to the next DIO packet. The node may only wake for DIO packets from its parent or back up parents even though it may have other neighbors or receive DIO timing information from other nodes. In other aspects, a node may wake for DIO packets from other neighbors based on the DIO timing information received from the other neighbors.

These illustrative examples are given to introduce the reader to the general subject matter discussed here and are not intended to limit the scope of the disclosed concepts. The following sections describe various additional aspects and examples with reference to the drawings in which like numerals indicate like elements. The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Exemplary Operating Environment

Figure 1:
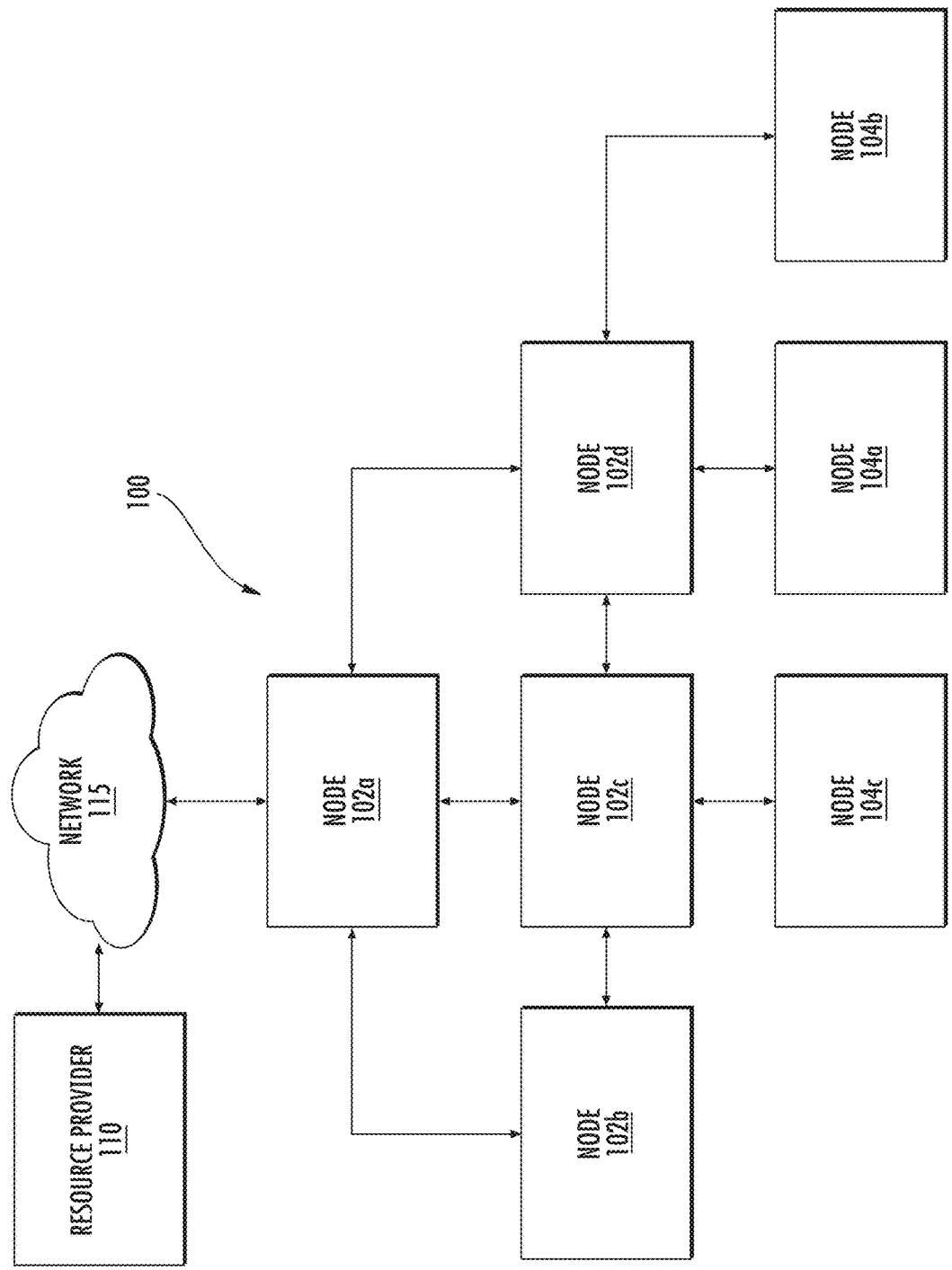
FIG. 1 is a block diagram of an example of a network for communicating timing information for a next DIO transmission according to one aspect of the present disclosure.

FIG. 1 depicts an exemplary wireless mesh network 100. The network 100 includes nodes 102a-d and 104a-c. One of the nodes 102a is communicatively coupled to a central system, such as a system associated with a resource provider 110, via network 115. The node 102a may facilitate communication between the central system and the other nodes. In one typical example, node 102a is a PAN coordinator, nodes 102b-d are mesh router nodes, and nodes 104a-c are LE nodes.

Nodes 104a-c can be used to perform one or more applications relating to managing, monitoring, or otherwise using information regarding one or more attributes of a resource distribution system associated with the resource provider 110. In some examples, a node 104a-c can include an intelligent metering device for monitoring and analyzing resource consumption, a programmable thermostat for managing resource consumption, or an in-home device for displaying information related to resource consumption and associated billing information for the resource consumption.

When nodes 104a-c are LE nodes, they can be powered by a power source with a limited capacity for sustained power usage but with sufficient capacity for bursts of communication. The bursts of communication can allow the LE nodes 104a-c to communicate with the other nodes on the network 100. The LE nodes may be powered by a battery, by vampire tapping, power harvesting, or other devices or processes. The LE nodes can be configured to conserve energy usage by entering a low power state by shutting down or limiting power to selected components (e.g., oscillators and transceivers).

Figure 2:
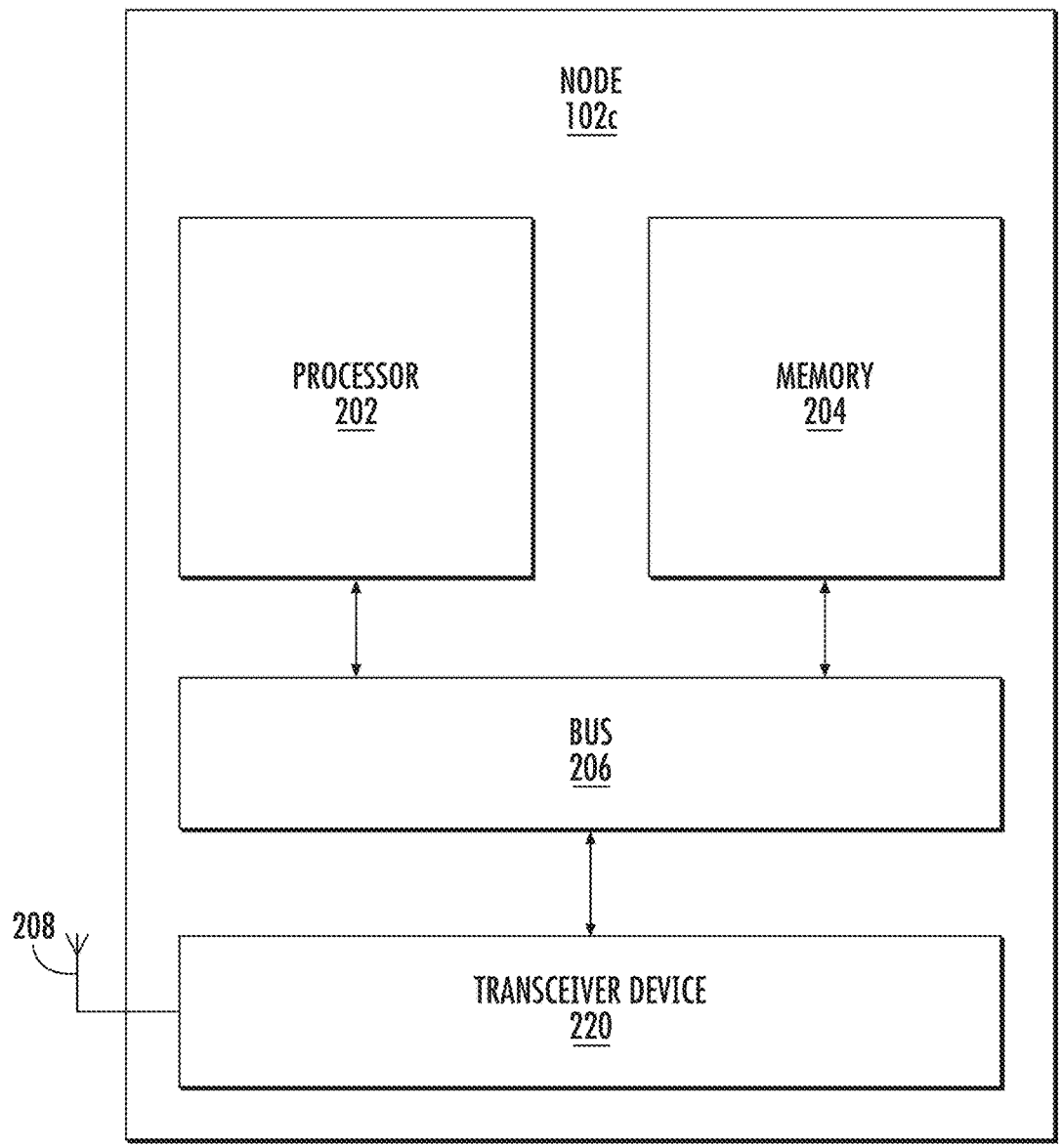
FIG. 2 is a block diagram of an example of a node according to one aspect of the present disclosure.

FIG. 2 depicts an example of node 102c illustrated in FIG. 1. The node 102c includes a processor 202, memory 204, and a transceiver device 220 each communicatively coupled via a bus 206. The components of node 102c can be powered by an A/C power supply. The transceiver device 220 can include (or be communicatively coupled to) an antenna 208 for communicating with other nodes in the network 100. In some examples, the transceiver device 220 can include a radio-frequency ("RF") transceiver for wirelessly transmitting and receiving signals.

In some examples, the processor 202 includes a microprocessor, an application-specific integrated circuit ("ASIC"), a state machine, a field programmable gate array ("FPGA") or other suitable computing device. The processor 202 can include any number of computing devices, including one. The processor 202 can be communicatively coupled to a non-transitory computer-readable media, such as memory 204. The processor 202 can execute computer-executable program instructions or access information stored in memory 204 to perform operations, such as those described herein.

Memory 204 may be a computer-readable medium such as (but not limited to) an electronic, optical, magnetic, or other storage device capable of providing a processor with computer-readable instructions. The instructions may comprise processor-specific instructions generated by a compiler and/or an interpreter from code written in any suitable computer-programming language. Additional or alternative examples of suitable computer-programming languages include C, C++, C#, Visual Basic, Java, Python, Perl, JavaScript, and ActionScript. Although the processor 202, memory 204, bus 206, and transceiver device are depicted in FIG. 2 as separate components in communication with one another, other implementations are possible.

Figure 3:
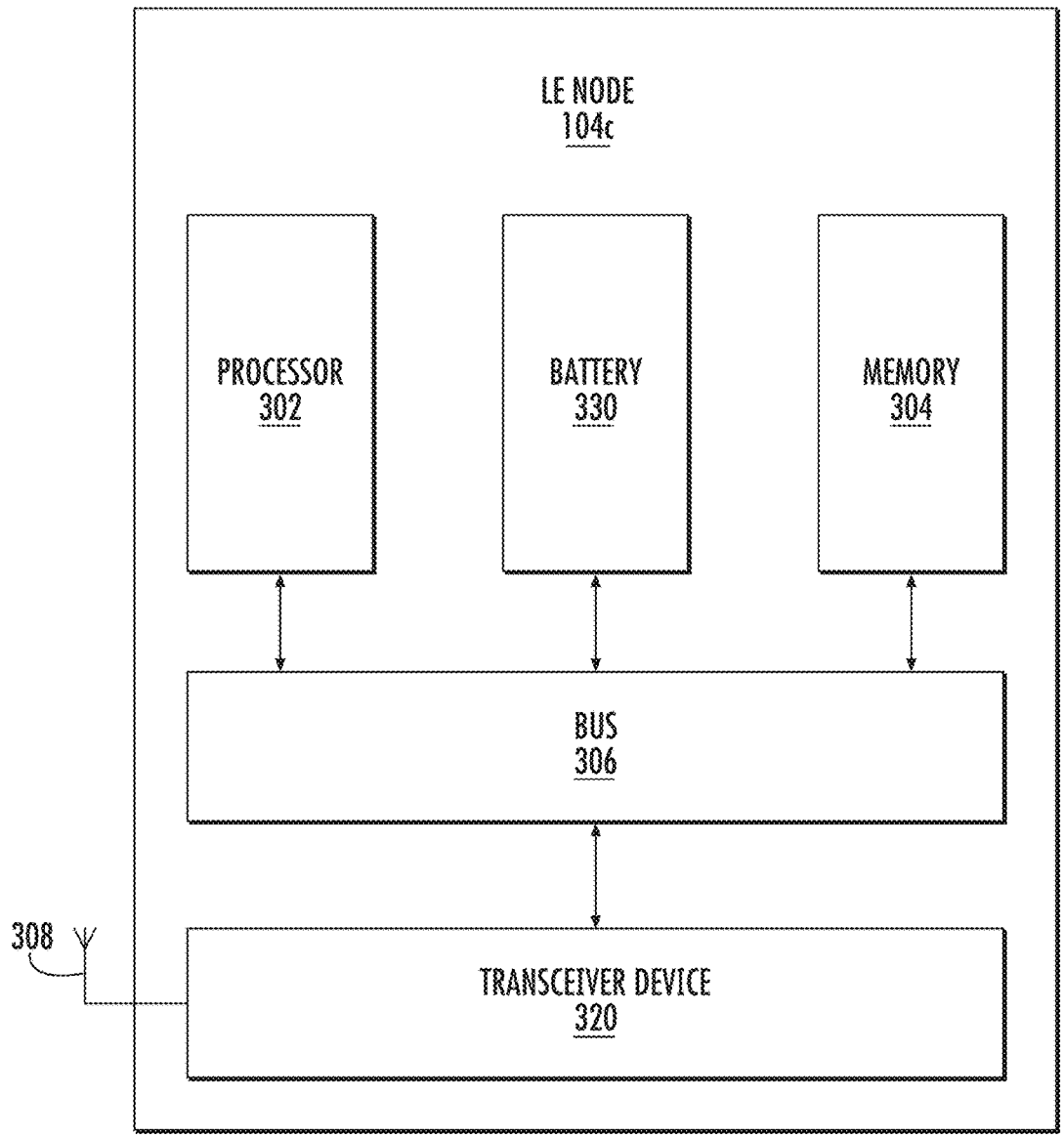
FIG. 3 is a block diagram of an example of a low energy node according to one aspect of the present disclosure.

FIG. 3 depicts an example of the LE node 104c illustrated in FIG. 1. The LE node 104c includes a processor 302, memory 304, and a transceiver device 320 each communicatively coupled via a bus 306. In some aspects, the processor 302, the memory 304, the transceiver device 320, and the bus 306 can be similar to the processor 202, the memory 204, the transceiver device 220, and the bus 206 respectively as described above with respect to FIG. 2. The processor 302, memory 304, the transceiver device 320, and the bus 306 can be powered by a battery 330. The transceiver device 320 can include (or be communicatively coupled to) an antenna 308 for communicatively coupling the LE node 104c to the network.

Figure 4:
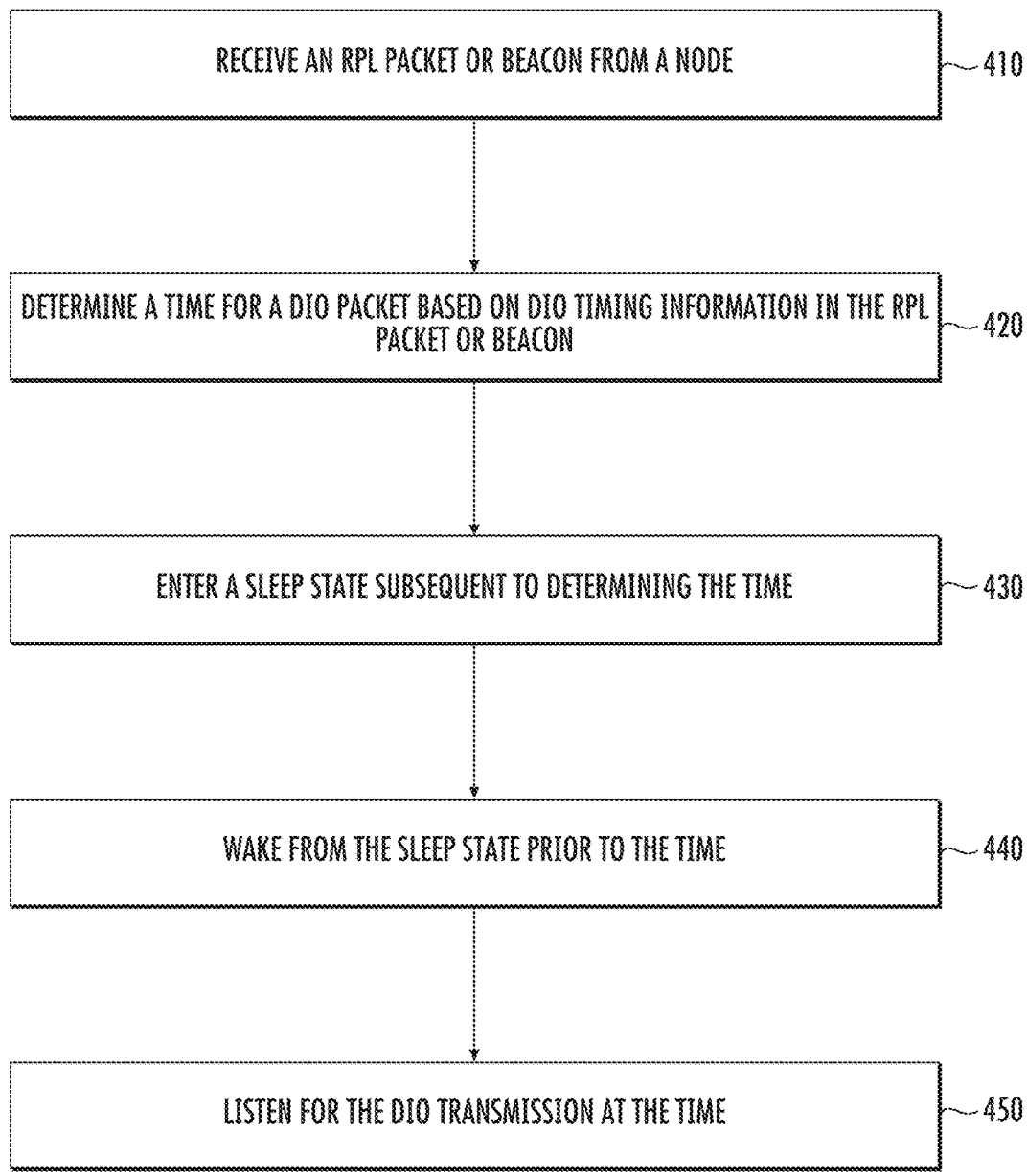
FIG. 4 is a flowchart of an example of a process for using DIO timing information by a low energy ("LE") device according to one aspect of the present disclosure.

FIG. 4 is a flowchart of an example of a process for receiving timing for a next DIO packet. For illustrative purposes, the process is described with reference to the system implementations depicted in FIG. 1. Other implementations, however, are also possible. In block 410, node 104c receives an RPL packet or a beacon from node 102c. The RPL packet may be a DIO packet, a DAO packet, or a DAO-ACK packet. In block 420, the node 104c determines a time for a next DIO packet based on DIO timing information in the RPL packet or beacon. In some aspects, the message (either an RPL packet or a beacon) is received by the LE device and includes a custom DIO timing information option or information element ("IE") with a portion of the option or IE indicating a type of time and another portion of the option or IE indicating an amount of time until the next DIO packet. For example, the IE can indicate whether the type of time is an actual time, an ASN, or a relative time or slot number, and can indicate a value for the amount of time.

In block 430, the node 104c enters a sleep state. In some examples, the node 104c can enter the sleep state in response to determining the time for the next DIO packet. The node 104c can consume less power in the sleep state. In block 440, the node 104c wakes up prior to the time when the next DIO packet is expected. The node 104c can include a clock or a counter that remains active in the sleep state and activates the node 104c at the appropriate time.

In block 450, the node 104c listens, at the time determined in block 420, for the DIO packet. In some examples, if the node 104c does not receive the DIO packet at the expected time, the node 104c continues listening for a predetermined period of time. After the predetermined period of time elapses, the node 104c can transmit a request for a time of the next DIO packet. For example, the node 104c can transmit a DODAG Information Solicitation ("DIS") or an enhanced beacon request and receive the time of the next DIO packet in response.

RPL Packet with DIO Timing Information

In some aspects, a node can determine when it will transmit the next DIO packet prior to sending the current RPL packet and can include DIO timing information in the current RPL packet. The node can execute a trickle algorithm, such as that defined in RFC 6206 to determine the timing for the next DIO packet. DIO timing information is information that a receiving node may use to determine the timing for the next DIO packet.

A new option may be added to an RPL packet to provide information about the timing of the next DIO transmission. The timing may be expressed as an Absolute Slot Number ("ASN") value, as a GMT time value, or as a relative time or slot number. In one example, the information is provided as shown below.

| | | 1 Byte | | |
|---|---|---|---|---|
| 1 Byte | 0 | 1-2 | 3-7 | 5 Bytes |
| Option | Reserved | Control Field | Reserved | Value |

In this example, the option is identified as a DIO timing option by the value in the option field, e.g. 0x10. The control field indicates whether the timing information is expressed as an ASN value, a GMT value, or a relative time value (e.g., 0=GMT; 1=ASN; 2=relative time). The value field provides the timing information value.

The transmitting node schedules the creation of the next DIO packet to account for any inter-layer communication or lower layer delays. The RPL module of the transmitting node creates the next DIO packet and passes it to the lower layer of the node along with the scheduled transmission time. The lower layer, e.g. MAC layer as defined by IEEE 802.15.4 or IEEE 802.11, transmits the DIO packet at the scheduled transmission time. In some instances, the lower layer designates the DIO packet as high priority so that it is transmitted at the scheduled transmission time.

When a receiving node receives the RPL packet it uses the information in the packet about the timing for the next DIO packet to determine when to listen for the next DIO packet. If the receiving node is an LE node, then it may enter a low power mode and wake up in time to receive the next DIO packet. In some instances, the LE node wakes up prior to the expected transmission time of the next DIO packet to allow for extra time to prepare to receive the packet (e.g., turn on its receiver). The LE node may also remain in a listening mode for a period of time after the expected transmission time to receive any retransmissions or account for delay in the transmission.

The receiving node, either LE or FFD, may consider the timing of the next DIO packet when determining its own operations. For example, the receiving node may delay its own RPL packet transmission or other transmissions to avoid a conflict with the next incoming DIO packet. If it delays its own RPL packet or a transmission failure occurs, then it may transmit its packet immediately within a guard time. In some aspects, such as TSCH, the guard time may be a few slots, e.g., 10 slots. In other aspects, retransmission may happen within Min (Min BackOff Interval, Guard Interval), where Min BackOff Interval=defined by back-off algorithm like in IEEE 802.15.4 or IEEE 802.11 and Guard Interval=predefined value in milliseconds.

Figure 5:
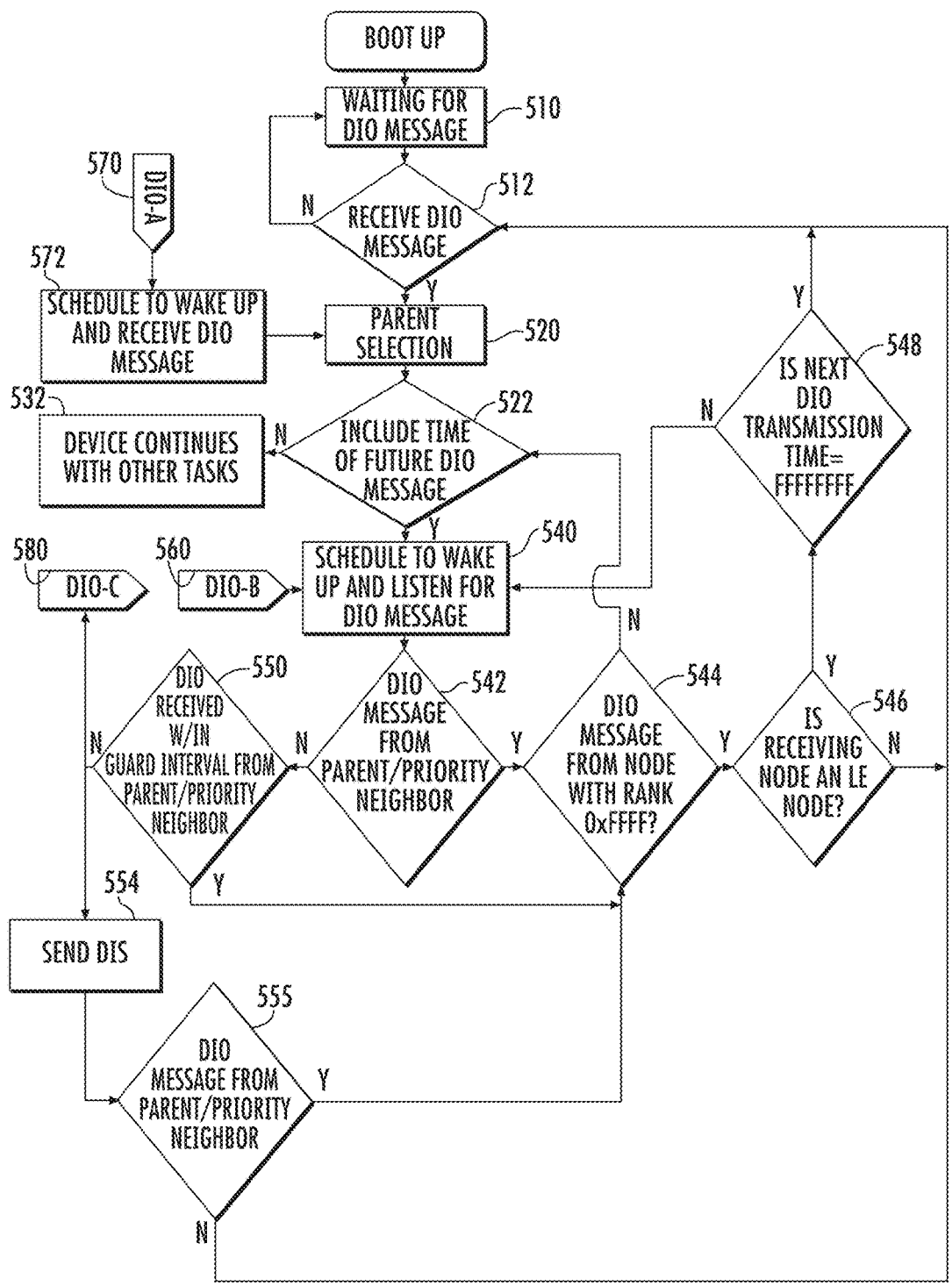
FIG. 5 is a flowchart of an example of a process for communicating DIO timing information in a DIO packet according to one aspect of the present disclosure.

FIG. 5 is a flow chart depicting an example of a process for determining a timing of a next DIO transmission from an RPL packet. FIG. 5 uses a DIO packet as an example, but as described above, other types of RPL packets may be used to provide DIO timing information. In FIG. 5, a node (e.g., the LE Node 104c in FIG. 1) can boot up and wait to receive a DIO transmission as depicted in block 510. At this time, the node may not be connected to the network. Once a DIO packet is received in block 512, the node can perform parent selection as depicted in block 520 and join the network by synchronizing with a parent node. If the DIO packet fails to include a time for the next DIO transmission, the node can continue with other tasks as depicted in block 532. If the DIO packet includes DIO timing information, the node can determine when to listen for the subsequent DIO transmission as depicted in block 540. If the node is a LE node, it may enter a low power state until the scheduled wake time. If the node is a FFD, it may remain active and perform other operations until the scheduled listen time.

If the node receives a DIO packet in block 542 from either its parent node or a priority neighbor node (e.g., backup parent) at the scheduled time, then the node follows the Yes branch to block 544. The node checks a rank value included in the DIO packet to determine whether the transmitting node is joined to the network. If the rank value indicates that the transmitting node is joined to the network, then the No branch is followed and the receiving node checks for the DIO timing information in block 522. If the DIO timing information is present, then the method continues to block 540.

If the DIO packet is not from either its parent node or a priority neighbor node at block 542, then the node follows the No branch to block 550. The node may continue to listen for a DIO packet for a period of time corresponding to a guard interval. If the node receives a DIO transmission within the guard interval, then it proceeds to block 544. If the node fails to receive a DIO transmission within the guard interval at block 550, then the node may request a DIO packet by transmitting a unicast DIS in block 554 to a parent node or priority neighbor from which it expected a DIO packet. In a further optimization, when the node is an LE node, the node can listen for a beacon at the MAC layer instead of transmitting a DIS by following block 580 to block 680 of FIG. 6.

If a DIO packet is received from a node other than the parent or priority neighbor, then the DIO packet is processed as per the RPL standard (e.g., received DIO packet may initiate Objective function execution, or parent selection algorithm). For example, if no DIO packet is received in block 550 or 555 from any node, then DIS may be transmitted again for a defined interval before declaring the node as detached from the network.

If the node receives a DIO packet after sending a DIS in block 544, then the node follows the Yes branch from block 555 to block 544. If the node does not receive a DIO packet or receives a DIO packet from a node other than a parent or priority neighbor, then the node follows the No branch from block 555 to block 512.

FIG. 5 also illustrates the situation where a DIO transmitting node becomes unjoined from the network. When the transmitting node becomes unjoined from the network, it transmits the next DIO packet as scheduled. The next DIO packet includes DIO timing information with the scheduled time value equal to the value used in the previous DIO transmisson and has a rank value set to a predetermined value, e.g. 0xFFFF, to indicate that the transmitting node is not joined to the network. If the node remains unjoined, it continues to transmit DIO packets with a rank value of 0xFFFF up to N times. After transmitting N DIO packets with a rank value of 0xFFFF, if the node has not re-joined the network, the node transmits a DIO packet with the ASN/GMT value set to 0xFFFFFFFF to prompt a receiving node to search for a new parent. A node that is detached from the network may send DIO packets based on a trickle timer or may use a predetermined transmission interval.

In FIG. 5, if a node receives a DIO packet with a rank value set to 0xFFFF in block 544, then the receiving node determines whether to remain with its current parent or search for a new parent. The determination may be based on whether the receiving node is an LE node or a FFD as shown in block 546. In some aspects, if the receiving node is an LE node, then the Yes branch is followed to block 548. The node remains with its current parent until it receives a DIO packet with the ASN/GMT value set to 0xFFFFFFFF. At that point the node is unjoined from the network and the Yes branch is followed to block 512 and the node listens for a DIO transmission and then may initiate parent selection in block 520. If the receiving node is a FFD, then the node may initiate parent selection after receiving a single DIO packet with a rank value of 0xFFFF by following the No branch from block 544 to block 546 and then proceeding to blocks 512 and 520. In other aspects, the decision in block 546 may be based on a condition other than the receiving node being a LE node. For example, if the node needs consistent routing, then it may initiate parent selection after receiving a single DIO packet with a rank value of 0xFFFF.

If the receiving node is a router node, when it receives a DIO packet with a rank set to 0xFFFF, it may transmit a DIO packet with a rank value set to 0xFFFF so that neighboring nodes do not select it as a parent. If the router node receives a DIO packet with the ASN/GMT value set to 0xFFFFFFFF, the router node may unjoin from the network, stop transmitting DIO packets, and search for a new parent.

Instead of transmitting the next DIO packet as scheduled, a node that becomes unjoined from the network may immediately stop transmitting DIO packets. If so, then the receiving nodes react in a manner similar to that discussed above in connection with the failure to receive a DIO packet in block 542. Neighboring nodes that were receiving DIO packets from the node may transmit a unicast DIS to the node. In further optimizations LE or leaf nodes may listen for a beacon instead of transmitting a DIS to save power by following block 580 to block 610 of FIG. 6.

If a trickle timer of a transmitting node is reset or suppressed, then the receiving nodes react in a manner similar to that discussed above in connection with the failure to receive a DIO packet in block 542. Neighboring nodes that were receiving DIO packets from the node may transmit a unicast DIS to the node. In further optimizations, an LE or leaf node may listen for a beacon instead of transmitting a DIS to save power by following block 580 to block 610 of FIG. 6. When the trickle timer is reset, the transmitting node may discontinue DIO transmissions and then determine a new schedule for DIO transmissions.

In some aspects, a node may receive a beacon from a parent that includes DIO timing information and enter the flow chart at block 560 (e.g., from 660 in FIG. 6) and then proceed to schedule a wake time and enter a sleep state in block 540. In additional or alternative aspects, a node may not have joined the network and may enter the flow chart at block 570 (e.g., from 670 in FIG. 6) and then proceed to enter a sleep state in block 572. The node may use the DIO timing information from a received beacon to determine a wake time. The process for arriving at blocks 560 and 570 is further explained in the description of FIG. 6 below.

Beacon with DIO Timing Information

In some aspects, a transmitting node can determine when the next DIO packet will be transmitted and include information about the timing for the next DIO packet in a beacon, such as a beacon as defined in IEEE 802.15.4. The RPL module provides information for the next DIO transmission to the lower layer (e.g., MAC layer) and the lower layer includes the DIO timing information in a beacon. The transmitting node may provide the DIO timing information in its beacon either because it is configured to do so or because it received an enhanced beacon request ("EBR") that included a request for DIO timing information. A node may send an EBR with a request for DIO timing information to its parent or when searching for a parent.

The transmitting node transmits a beacon with a new Information Element ("IE") to provide information about the timing of the next DIO transmission. The timing may be expressed as an ASN value or as a GMT time value. In one example, the IE is shown below.

| 1 Byte | | | |
|---|---|---|---|
| 0 | 1-2 | 3-7 | 5 Bytes |
| Type | Control Field | Reserved | Value |

In this example, the IE is 6 bytes. In some examples, the type field may identify the IE as a DIO timing information IE (e.g., type=0) in a beacon. When the IE includes DIO timing information, the control field indicates whether the timing information is expressed as an ASN value, a GMT value, or a relative time or slot number, and the value field provides the value. In additional or alternative examples, the IE may be included in an EBR. If so, the type field may indicate a request for DIO timing information is present in an EBR (type=1). When the DIO timing information IE is included in an EBR the control field and the value field are not used.

When the receiving node receives a beacon with the DIO timing information IE, the receiving node passes the DIO timing information to its RPL module. The receiving node may use the received DIO timing information to determine when to listen for a DIO packet.

Figure 6:
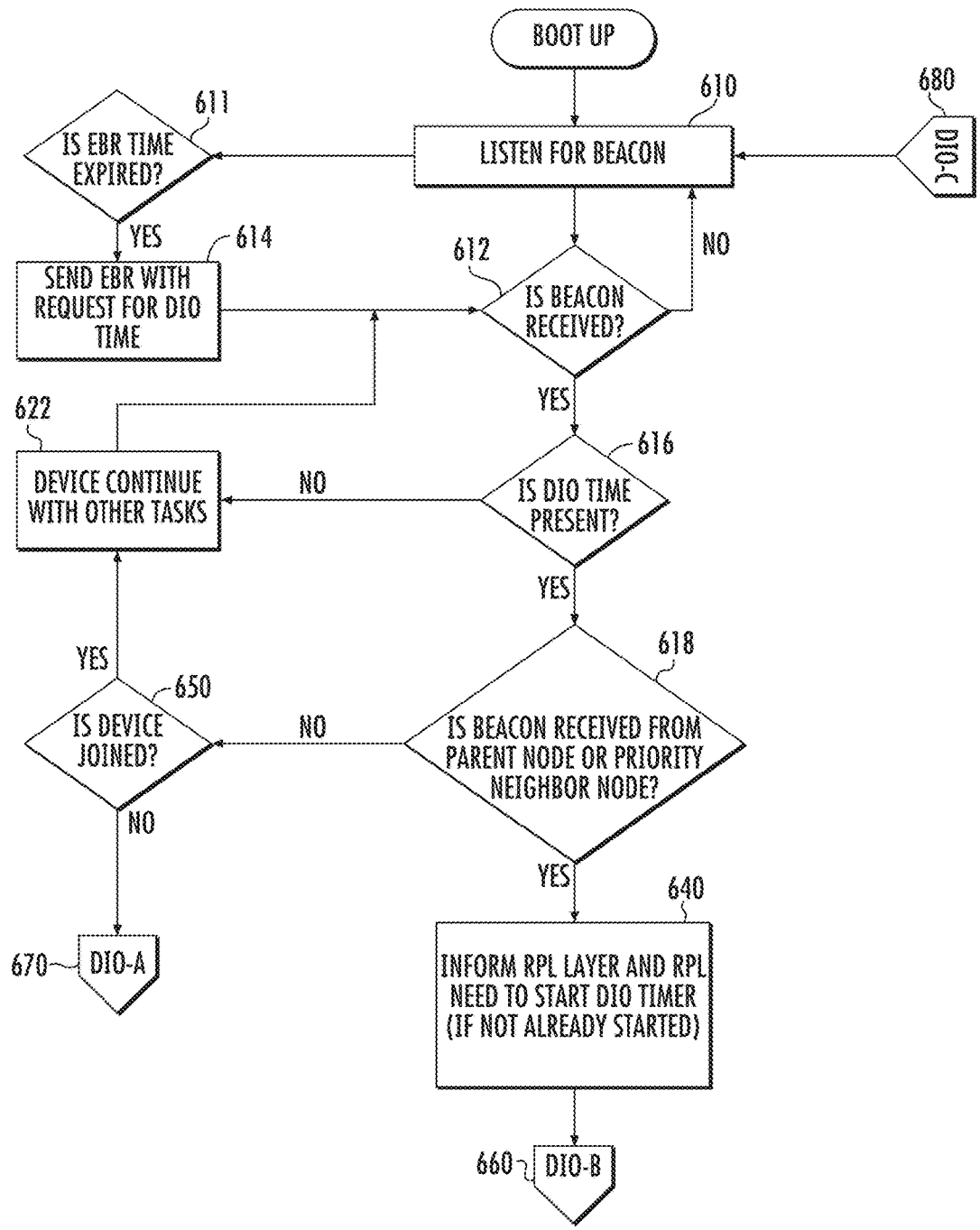
FIG. 6 is a flowchart of an example of a process for communicating DIO timing information in a beacon according to one aspect of the present disclosure.

FIG. 6 is a flowchart of an example of a process for determining a timing of a DIO transmission from a beacon. A receiving node can boot up and wait for a beacon as depicted in block 610. If the node receives a beacon in block 612, the node determines whether the beacon includes DIO timing information in block 616 and whether the beacon is from its parent node or a priority neighbor node in block 618. If so, then the DIO timing information is passed to the RPL module in block 640 so it can start a DIO timer (if not already started). The DIO timer may be used to determine when the receiving node should listen for the next DIO packet. The node can move to block 660 and proceed to block 560 of FIG. 5. The node may schedule a time to wake up and listen for the next DIO transmission as depicted in block 540 of FIG. 5.

If the node receives a beacon, but the beacon does not include DIO timing information, then the No branch is followed to block 622 and the node continues with other tasks until it receives another beacon.

If the node receives a beacon with DIO timing information, but the beacon is received from a node other than its parent or a priority neighbor node, then if the receiving node is already joined to the network at block 650 (i.e., it has a parent), it proceeds to block 622. If the receiving node is not joined to the network, then it may proceed to block 670, and then to block 570 in FIG. 5. It may enter a low power state and schedule a wake up time in block 572 so that it will be awake for the next DIO packet based on the DIO timing information in the beacon.

If the enhanced beacon request ("EBR") time expires in 611 while the node is waiting for a beacon, the node may transmit an EBR requesting a beacon with DIO timing information, as depicted in block 614. The EBR may include the IE for DIO timing information with the type value set to 1 to request DIO timing information. When the parent node receives an EBR with the IE requesting DIO timing information, the parent node includes DIO timing information in the next beacon. In some instances the node sends an EBR with the IE for DIO timing information when it is searching for a parent. Once a beacon is received, the method continues with block 616.

FIG. 6 illustrates that the IE for DIO timing information is included in a beacon or an EBR. In other examples, this IE may be included in an association response.

The methods of FIGS. 5 and 6 may be used independently or in combination so that DIO timing information may be provided in a beacon and/or an RPL packet.

Allocation of DIO Time Slot

In some examples, the network can include a time synchronized channel hopping ("TSCH") network where the nodes communicate using a TSCH protocol, such as that defined by IEEE 802.15.4. Each timeslot in a TSCH network is of duration "T" which can be defined in milliseconds or other appropriate time unit. A repeating hopping pattern defines the channel frequency used to communicate during each timeslot. A network coordinator, such as a PAN coordinator, may allocate time slots to the nodes for transmitting DIO packets, in addition to allocating time slots for transmitting beacons and communicating with other nodes.

Figure 7:
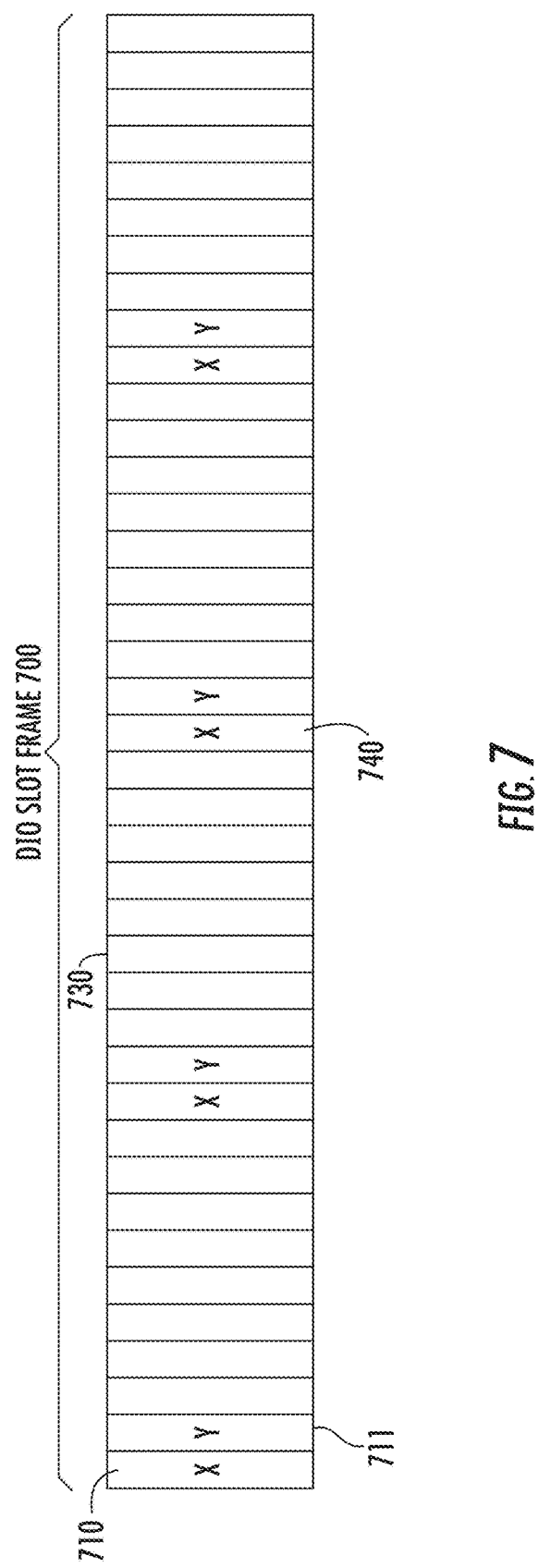
FIG. 7 is a block diagram of an example of a DIO slot frame with timeslots allocated for DIO transmission according to one aspect of the present disclosure.

To allocate time slots for DIO packets, the system considers the minimum trickle interval for DIO, i.e., the minimum interval between DIO transmissions. The minimum trickle interval and the slot duration are used to determine a DIO slot frame. Generally the minimum trickle interval is assigned by the RPL root and is set at the time of network deployment. FIG. 7 is an example of a DIO slot frame 700. In this example, the minimum trickle interval is ninety seconds and the slot duration T is twenty five milliseconds. The DIO slot frame 700 is set to be four times the minimum trickle interval or 360 seconds. The DIO slot frame includes 14,400 time slots. Since the DIO slot frame is four times the minimum trickle interval, each node is allocated 4 DIO time slots within the DIO slot frame at an interval of 90 seconds, i.e., 3600 slots. Other implementations may use a factor other than 4 to determine the DIO slot frame duration or may use some other slot frame to allocate DIO slots.

In FIG. 7, four time slots are allocated to each of node X and node Y in the DIO slot frame. The main DIO slots 710, 711 are the lowest slot numbers within the DIO slot frame allocated to node X and node Y.

The PAN coordinator may provide nodes X and Y with their DIO slot allocations in an association response. Nodes X and Y may provide information on their allocated DIO slots in their beacons. A node that receives a beacon from node X or node Y may schedule its wake up times based on the allocated DIO slot information in the received beacon. For example, if node X is a parent or priority neighbor node for a receiving node, then the receiving node may schedule its wake up times to correspond to the allocated time slots for node X.

When node X determines that it is time to transmit a DIO packet, its RPL module generates the packet and sends it to a lower layer for transmission. The lower layer recognizes the packet as a DIO packet and transmits the DIO packet at the next allocated DIO slot. For example, if the trickle timer for node X expires at time slot 730, then the lower layer in node X may transmit the DIO packet at time slot 740.

The timing of the next DIO transmission may determine which DIO slot is used to transmit the next DIO packet. If the timing of the next DIO transmission is greater than the duration of the DIO slot frame or greater than a configured value, then the next DIO packet may be transmitted during the next main DIO slot after the expiration of the trickle timer for the transmitting node. For example, when the trickle timer expires at time slot 730, the next DIO packet may be transmitted at the next main DIO slot in the DIO slot frame (not shown). If the timing of the next DIO transmission is less than the duration of the DIO slot frame or the configured value, then the next DIO packet may be transmitted during the next DIO slot for the transmitting node. The RPL module may indicate to the lower layer whether the DIO packet is to be transmitted at the next main DIO slot or the next DIO slot.

A node that receives a DIO packet from node X may configure its wake up or listening times based on the DIO timing information in the DIO packet. If the DIO timing information indicates that the time until the next DIO transmission is greater than the duration of the DIO slot frame or the configured value, then the receiving node, may schedule its next wake up time to correspond to the next main DIO slot allocated for node X. If the DIO timing information indicates that the time until the next DIO transmission is less than the duration of the DIO slot frame or the configured value, then the receiving node, may schedule its next wake up time to correspond to the next DIO slot allocated for node X.

In some aspects, if node X fails to transmit a DIO packet successfully during its scheduled slot, it can attempt retransmission in the immediate next slot. A receiving node can listen for the DIO transmission during the scheduled slot and for a predetermined number of slots after the scheduled slot. The additional slots provide a guard interval so that the receiving node can listen for a retransmission of the DIO transmission. If the receiving node fails to receive the DIO packet within the guard interval, then the receiving node may listen for a DIO transmission during the next scheduled DIO slots before it starts seeking DIO information through a beacon.

Figures 8, 9, 10:
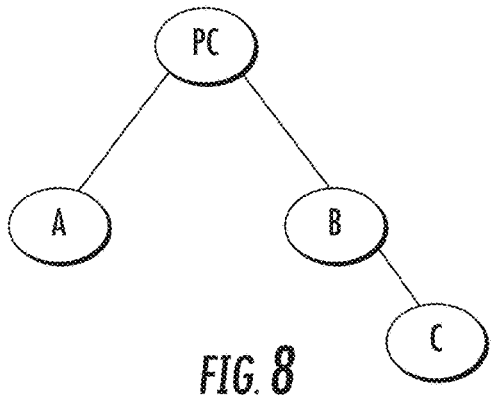
FIG. 8 is a block diagram of an example of a network with four nodes including a coordinator node according to one aspect of the present disclosure.
FIG. 9 is a table of an example of time slot allocations by the coordinator in FIG. 8 for beacon transmissions and communications between nodes according to one aspect of the present disclosure.
FIG. 10 is a table of an example of time slot allocations for DIO transmissions according to one aspect of the present disclosure.

FIG. 8 illustrates an exemplary network. There are four nodes in the network, including a PAN coordinator PC. The PAN coordinator may allocate slots for beacon transmissions, communications between nodes, and DIO transmissions. FIG. 9 illustrates slot allocations for beacon transmissions (e.g., $PC_{adv}$, $A_{adv}$) and communications between nodes (e.g., PC→A, B→C). For example, the time slot with ASN=0 is allocated to allow the PAN coordinator to communicate with node A and node B to communicate with node C. The time slot with ASN=1 is allocated to the PAN coordinator for a beacon advertisement and to nodes A and B for receiving communications from the network. FIG. 10 illustrates the slot allocations of FIG. 9 with additional slots allocated for DIO transmissions (e.g., $PC_{dio}$, $B_{dio}$). For example, the time slot with ASN=2 is allocated to the PAN coordinator for a DIO transmission and to nodes A and B for receiving communications from the network. The rows in FIGS. 9 and 10 correspond to channel offsets.

If a node becomes unjoined from the network, then it may continue to transmit DIO packets during its allocated DIO time slots and adjust its rank value to 0xFFFF and its DIO transmission time value to 0xFFFFFFFF, as discussed above in connection with FIG. 5. The receiving node may process a received DIO packet with a rank value of 0xFFFF or a DIO transmission time value of 0xFFFFFFFF, as described above in connection with FIG. 5.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:

1. A method for a node communicatively coupled to a network using a routing protocol for low-power and lossy networks ("RPL"), the method comprising:

using a trickle timer to determine a plurality of transmission intervals for a plurality of destination oriented directed acyclic graph ("DODAG") information object ("DIO") packets, wherein each transmission interval is based on a current state of the network;

determine DIO timing information for a second DIO packet; transmitting a first DIO packet based on the trickle timer, wherein the first DIO packet includes the DIO timing information for the second DIO packet and DIO rank information for the node;

after the node is unjoined from the network, transmitting a third DIO packet that includes DIO timing information for a fourth DIO packet and DIO rank information indicating that the node is unjoined from the network;

wherein a DIO timing option in the first DIO packet specifies a value for an amount of time and a value for a type of time; and wherein so long as the node remains unjoined from the network, transmitting additional DIO packets, each additional DIO packet includes DIO timing information for a next additional DIO packet and the DIO rank information indicating that the node is unjoined from the network.

2. The method of claim 1, wherein after the node remains unjoined for a predetermined amount of time, the additional DIO packet includes DIO timing information with the value for the amount of time set to a predetermined value.

3. The method of claim 1, wherein the value for the amount of time corresponds to an absolute slot number when the value for the type of time corresponds to a slot number.

4. The method of claim 1, wherein the value for the amount of time corresponds to a time interval when the value for the type of time corresponds to a relative time.

5. The method of claim 1, wherein transmitting a first DIO packet based on the trickle timer comprises transmitting the first DIO packet during an allocated DIO time slot.

* * * * *